(12) United States Patent
Hong

(10) Patent No.: US 12,342,277 B2
(45) Date of Patent: Jun. 24, 2025

(54) METHODS, AND APPARATUSES FOR CONTROLLING TERMINAL

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 332 days.

(21) Appl. No.: 17/998,105

(22) PCT Filed: May 8, 2020

(86) PCT No.: PCT/CN2020/089229
§ 371 (c)(1),
(2) Date: Nov. 7, 2022

(87) PCT Pub. No.: WO2021/223226
PCT Pub. Date: Nov. 11, 2021

(65) Prior Publication Data
US 2023/0180126 A1 Jun. 8, 2023

(51) Int. Cl.
*H04H 20/71* (2008.01)
*H04W 36/00* (2009.01)
*H04W 52/02* (2009.01)
*H04W 76/27* (2018.01)

(52) U.S. Cl.
CPC ... *H04W 52/0212* (2013.01); *H04W 36/0055* (2013.01); *H04W 76/27* (2018.02)

(58) Field of Classification Search
USPC ........................................................ 370/311
See application file for complete search history.

(56) References Cited

U.S. PATENT DOCUMENTS

| 9,319,982 | B2 | 4/2016 | Chen et al. | |
|---|---|---|---|---|
| 10,728,854 | B2 | 7/2020 | Xia et al. | |
| 2014/0051438 | A1 | 2/2014 | Chen et al. | |
| 2017/0150434 | A1* | 5/2017 | Huang | H04W 48/18 |
| 2017/0311375 | A1* | 10/2017 | Jung | H04W 76/27 |
| 2018/0098311 | A1 | 4/2018 | Hong et al. | |
| 2018/0234894 | A1* | 8/2018 | Jiang | H04W 60/06 |

(Continued)

FOREIGN PATENT DOCUMENTS

| CN | 102172082 A | 8/2011 |
|---|---|---|
| CN | 105338585 A | 2/2016 |

(Continued)

OTHER PUBLICATIONS

3GPP, "3rd Generation Partnership Project; Technical Specification Group Radio Access Network; NR; Radio Resource Control (RRC) protocol specification (Release 15)", 3GPP TS 38.331 V15.5.0, Mar. 2019, 491 pages.

(Continued)

*Primary Examiner* — Chuong T Ho
(74) *Attorney, Agent, or Firm* — Oblon, McClelland, Maier & Neustadt, L.L.P.

(57) ABSTRACT

Methods, and apparatuses for controlling a terminal are provided. In one aspect, according to the method for controlling the terminal, a first signaling is configured, where the first signaling is for indicating the terminal to switch from a connected state to an idle state and to reside on a target network. The first signaling is then sent to the terminal.

17 Claims, 7 Drawing Sheets

(56) References Cited

U.S. PATENT DOCUMENTS

| | | | | |
|---|---|---|---|---|
| 2018/0352480 A1 | 12/2018 | Dong et al. | | |
| 2019/0174406 A1* | 6/2019 | Hwang | ................ | H04W 36/08 |
| 2019/0174421 A1* | 6/2019 | Quan | ................ | H04W 76/27 |
| 2019/0349825 A1* | 11/2019 | Tseng | ................ | H04W 48/20 |
| 2019/0373552 A1 | 12/2019 | Xia et al. | | |
| 2020/0084655 A1* | 3/2020 | Fiorani | ................ | H04W 24/08 |
| 2020/0275377 A1 | 8/2020 | Xia et al. | | |
| 2021/0345440 A1* | 11/2021 | Fiorani | ................ | H04W 24/08 |
| 2021/0377829 A1* | 12/2021 | Wang | ................ | H04W 24/10 |
| 2022/0386202 A1* | 12/2022 | You | ................ | H04W 84/06 |
| 2023/0363025 A1* | 11/2023 | Sha | ................ | H04W 72/23 |

FOREIGN PATENT DOCUMENTS

| | | |
|---|---|---|
| CN | 105357403 A | 2/2016 |
| CN | 105376819 A | 3/2016 |
| CN | 108476441 | 8/2018 |
| CN | 1101 49680 A | 8/2019 |
| CN | 110505709 A | 11/2019 |
| CN | 110831096 A | 2/2020 |
| CN | 111543118 A | 8/2020 |
| CN | 111699716 A | 9/2020 |
| WO | WO 2019/084716 A1 | 5/2019 |

OTHER PUBLICATIONS

International Search Report with English Translation mailed on Feb. 8, 2021 in PCT/CN2020/089229 filed on May 8, 2020 (6 pages).

\* cited by examiner

METHODS, AND APPARATUSES FOR CONTROLLING TERMINAL

CROSS REFERENCE TO RELATED APPLICATIONS

This application is a U.S. national phase application of PCT Application No. PCT/CN2020/089229, filed on May 8, 2020, the entire contents of which are incorporated herein by reference for all purposes.

TECHNICAL FIELD

The present disclosure relates to the field of communication and, in particular, to methods, and apparatuses for controlling a terminal and a storage medium.

BACKGROUND

At present, 5th generation mobile networks (5G) standard has been basically completed. With the deployment and improvement of 5G network, more and more cell phone manufacturers have launched 5G cell phones. In order to save the power of cell phone, the network side can configure Discontinuous Reception (DRX) for the terminal. The DRX configuration includes configurations of inactivity timer, on duration timer, cycle and start offset, uplink Hybrid Automatic Repeat reQuest (HARQ) Round-Trip Time (RTT) timer, downlink HARQRTT timer, uplink retransmission timer, downlink retransmission timer, etc. The cycle, start offset and on duration timer can be used to determine a start time point of the cycle of the on duration timer. The terminal may listen to a Physical Downlink Control Channel (PDCCH) only during an on duration period, and may not listen to the PDCCH at other times, thus saving power consumption. The on duration period includes operation periods of the on duration timer, inactivity timer, uplink retransmission timer, and downlink retransmission timer.

However, during the development and use of 5G terminals, it was found that even configured with DRX, the power consumption of 5G terminals is much higher than that of 4G terminals. And regardless of whether 5G terminals are in a connected state or other states, the power consumption of 5G terminals exceeds that of 4G terminals.

SUMMARY

According to a first aspect of the examples of the present disclosure, a method of controlling a terminal is provided, which is applied to a base station. The method includes: configuring a first signaling, where the first signaling is for instructing the terminal to switch from a connected state to an idle state and to reside on a target network; sending the first signaling to the terminal.

According to a second aspect of the examples of the present disclosure, a method of controlling a terminal is provided, which is applied to a terminal. The method includes: sending a target request for switching from a connected state to an idle state and residing on a target network to a base station; receiving a first signaling configured and sent by the base station based on the target request; switching from the connected state to the idle state and residing on the target network according to the first signaling.

According to a third aspect of the examples of the present disclosure, an apparatus for controlling a terminal is provided, which is applied to a base station. The apparatus includes: a processor; a memory for storing instructions executable by the processor; where the processor is configured to perform the method for controlling the terminal according to the first aspect.

According to a fourth aspect of the examples of the present disclosure, an apparatus for controlling a terminal is provided, which is applied to a terminal. The apparatus includes: a processor; a memory for storing instructions executable by the processor; where the processor is configured to perform operations: sending a target request for switching from a connected state to an idle state and residing on a target network to a base station; receiving a first signaling configured and sent by the base station based on the target request; switching from the connected state to the idle state and residing on the target network according to the first signaling.

It is to be understood that the above general descriptions and the below detailed descriptions are merely exemplary and explanatory, and are not intended to limit the present disclosure.

BRIEF DESCRIPTION OF THE DRAWINGS

The accompanying drawings herein, which are incorporated in and constitute a part of the present description, illustrate examples consistent with the present disclosure and serve to explain the principles of the present disclosure together with the description.

DETAILED DESCRIPTION OF THE EMBODIMENTS

Figure 1:
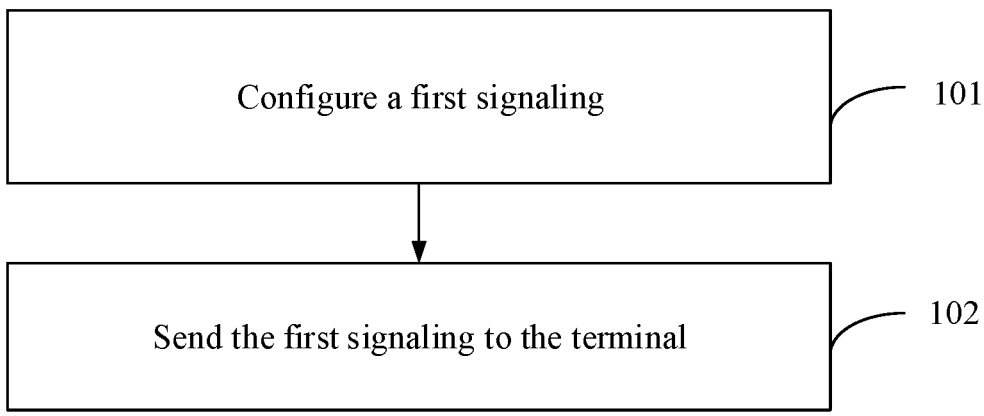
FIG. 1 is a schematic flow diagram illustrating a method for controlling a terminal according to an example.

Examples will be described in detail herein, with the illustrations thereof represented in the drawings. When the following descriptions involve the drawings, like numerals in different drawings refer to like or similar elements unless otherwise indicated. The implementations described in the following examples do not represent all implementations consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It shall be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

To overcome the problems in the related art, examples of the present disclosure provide methods and apparatuses for controlling a terminal.

A method of controlling a terminal (or UE) provided by the present disclosure is described below first from the perspective of a base station.

An example of the present disclosure provides a method for controlling a terminal, which can be applied to a base station. With reference to FIG. 1, FIG. 1 is a schematic flow diagram illustrating a method for controlling a terminal according to an example. The method may include the following steps.

At step 101, a first signaling is configured.

In the example of the present disclosure, the first signaling is for instructing a terminal to switch from a connected state to an idle state and to reside on a target network. In some examples, the first signaling can be a Radio Resource Control (RRC) Release signaling. Through the first signaling, the terminal is enabled to switch from the connected state to the idle state and reside on the target network. In some examples, the target network is a communication network different from the network which the terminal is currently on.

For example, if the terminal is currently on a 5G network, the base station can configure the first signaling to enable the terminal to switch to the idle state and reside on a 4G network.

At step 102, the first signaling is sent to the terminal.

In the above example, the base station can configure the first signaling and send it to the terminal so that the terminal can switch from the connected state to the idle state and reside on the target network, thereby saving power consumption of the terminal.

In some examples, in order for the terminal to reside on the target network, a first information unit existing in the first signaling can be configured, where the first information unit is an information unit for indicating cell reselection priorities, or it can be a CellReselectionPriorities information unit.

At step 101, configuring the first information unit existing in the first signaling may include at least one of the following implementations.

In an implementation, a priority for a network frequency of the target network is configured in the first information unit to be higher than the priority for the network frequency of the network which the terminal is currently on.

In the example of the present disclosure, the base station may raise the priority for the network frequency of the target network to be higher than the priority for the network frequency of the network which the terminal is currently on. Subsequently the terminal will reside on the target network according to the priority for the network frequency.

In another implementation, priorities for different network frequencies are configured in the first information unit based on a priority order of the network frequencies of expected connected networks requested by the terminal.

In the example of the present disclosure, the base station can configure the priorities for different network frequencies based on the information requested by the terminal.

For example, the priority order for the network frequencies expected by the terminal from high to low is the network frequency of the 4G network, 5G network and 3G network respectively. Then the base station can configure the priority for the network frequency of the 4G network to be the highest and the priority for the network frequency of the 3G network to be the lowest according to the priority order of the network frequencies of the expected connected networks requested by the terminal.

In another implementation, a time length of a target timer is configured in the first information unit as a target value.

In the example of the present disclosure, the target timer is a timer for indicating a valid time length of the priorities for the network frequencies, which may be a T320 timer, and the target value includes an infinite value or an expected value of the time length requested by the terminal. The priorities for the network frequencies expected by the terminal are valid until the target timer expires, thereby ensuring that the terminal resides on the target network.

In the above example, the base station, in the process of configuring the first information unit, may use at least one of the following methods: configuring, in the first information unit, a priority for a network frequency of the target network to be higher than a priority for a network frequency of a network which the terminal is currently on, so that the terminal can reside on the target network; configuring, in the first information unit, priorities for different network frequencies based on a priority order for network frequencies of expected connected networks requested by the terminal, so as to improve the accuracy of reducing power consumption for different terminals; configuring, in the first information unit, a time length of a target timer as a target value, where the target value includes an infinite value or an expected value of the time length requested by the terminal, so that the terminal can reside on the target network before the target timer expires, which provides a high availability.

In some examples, for step 101, the base station may configure the first signaling upon determining that the terminal in the connected state requires power saving. Further, the base station, upon receiving a target request sent by the terminal to the base station via a second signaling, determines that the terminal in the connected state requires power saving based on the target request. The target request is used by the terminal to request to switch its state from the connected state to the idle state and to reside on the target network.

The second signaling may include a RRC signaling, and further, the RRC signaling may be a terminal auxiliary information signaling. The terminal requests, through the second signaling, the base station to switch the state of the terminal from the connected state to the idle state and to enable the terminal to reside on the target network, which is easily implemented and highly available.

In some examples, a second information unit can be newly added to the second signaling, and the terminal informs the base station of its own expected configuration information through the second information unit, and the base station can subsequently configure the first signaling based on the expected configuration information. The second information unit may be a ReleaseRequest information unit.

Figure 2:
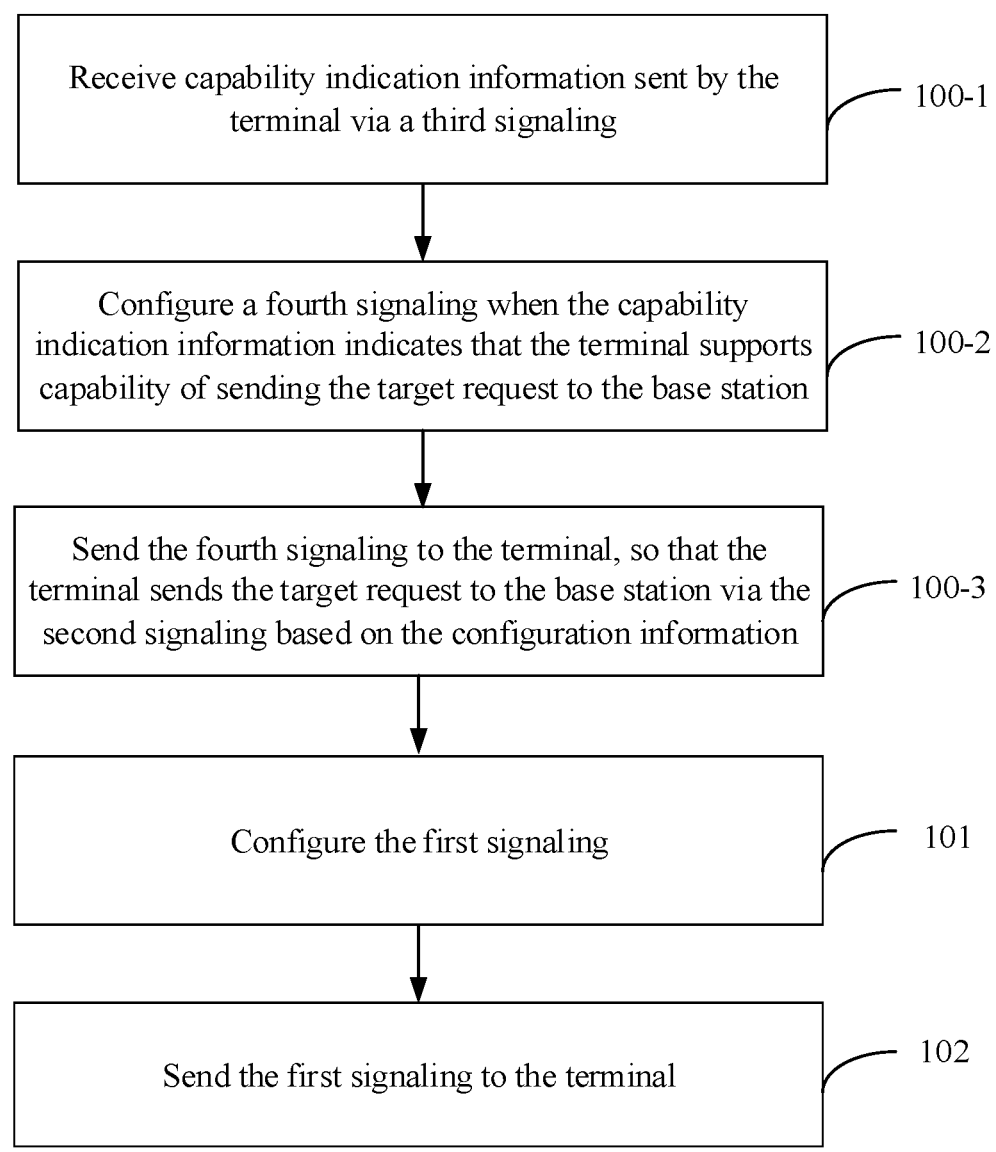
FIG. 2 is a schematic flow diagram illustrating another method for controlling a terminal according to an example.

In some examples, referring to FIG. 2, which is a flow diagram illustrating another method for controlling a terminal according to the example shown in FIG. 1, prior to performing step 101, the method may further include the following steps.

At step 100-1, capability indication information sent by the terminal via a third signaling is received.

The capability indication information is used to indicate whether the terminal supports the capability of sending to the base station a target request for switching from a connected state to an idle state and residing on the target network. The third signaling may be a RRC signaling, furthermore, it may be a UE-NR-Capability signaling.

At step 100-2, a fourth signaling is configured when the capability indication information indicates that the terminal supports the capability of sending the target request to the base station.

The base station may configure a fourth signaling for the terminal based on the capability indication information in the third signaling, in the case that the terminal supports the capability of sending the target request to the base station. The fourth signaling is for indicating configuration information for the terminal to report the target request.

In some examples, the fourth signaling can be an RRCReconfiguration signaling. The fourth signaling includes existing OtherConfig (i.e., other configuration) information unit, and the base station may configure in the OtherConfig information unit the configuration information for the terminal to report the target request. When configuring the configuration information for the terminal to report the target request in the OtherConfig information unit of the fourth signaling, the base station can use at least one of the following implementations.

In one implementation, indication information on whether to allow the terminal to report the target request is configured in the OtherConfig information unit.

The terminal will send the target request to the base station in case that the indication information allows the terminal to report the target request.

In another implementation, a time length of a reporting block timer is configured in the OtherConfig information unit.

The above reporting block timer is a timer newly introduced by the present disclosure, and it is required for the terminal to wait for at least the time length of the reporting block timer before it can report the target request to the base station, thus avoiding the power loss caused by the terminal continuously reporting the target request.

In another implementation, a reporting condition of the target request is configured in the OtherConfig information unit.

The reporting condition of the target request may include a condition under which the terminal is allowed to report the target request, such as allowing the terminal to report the target request under condition that the terminal has not used the current network for a preset period of time. The terminal sends the target request to the base station only when the reporting condition is satisfied.

In another implementation, at least one of the content and format of the target request is configured in the OtherConfig information unit.

The content of the target request includes information that can be carried in the target request, and the format of the target request is a data format used by the terminal to report the target request. When reporting the target request, the terminal needs to follow the content and format configured by the base station.

At step 100-3, the fourth signaling is sent to the terminal so that the terminal can send the target request to the base station via the second signaling based on the configuration information indicated by the fourth signaling.

In this example, the terminal, after receiving the fourth signaling, can determine the configuration information included in the OtherConfig information unit therein, and thus send a target request to the base station based on the configuration information so that the base station can configure and send the first signaling for the terminal, thereby achieving the purpose for saving power of the terminal.

The method of controlling the terminal provided by the present disclosure is then described below from the perspective of the terminal.

Figure 3:
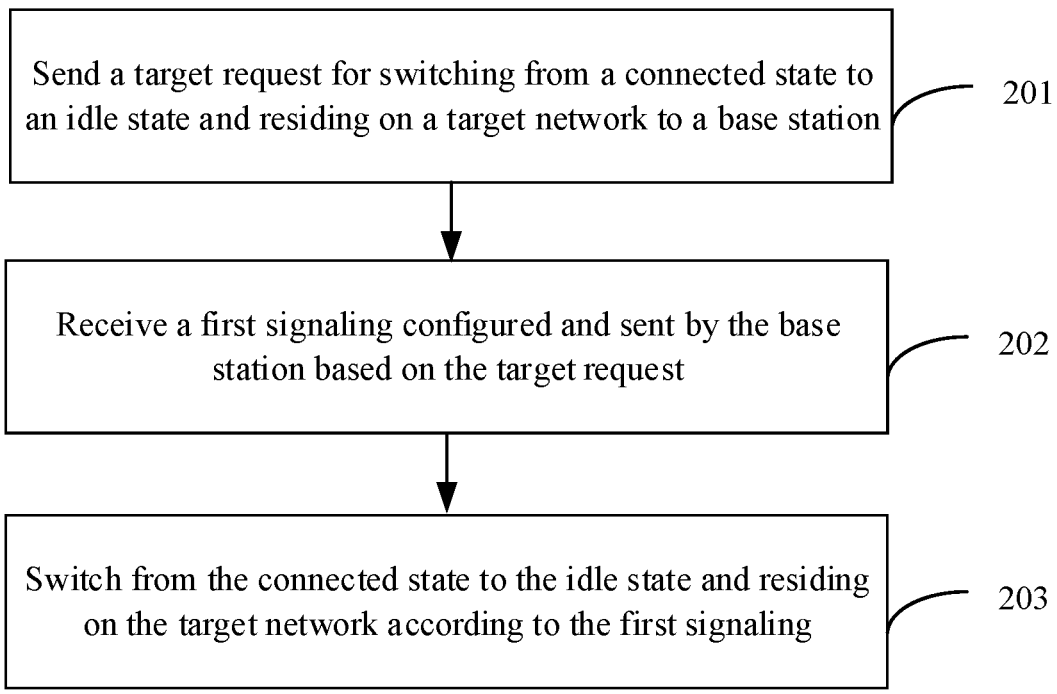
FIG. 3 is a schematic flow diagram illustrating another method for controlling a terminal according to an example.

In an example, with reference to FIG. 3, FIG. 3 is a flow diagram illustrating another method of controlling a terminal according to an example. The method may be applied to a terminal and includes the following steps.

At step 201, a target request for switching from a connected state to an idle state and residing on the target network is sent to the base station.

The target network is a communication network different from a network where the terminal is currently on.

At step 202, a first signaling configured and sent by the base station based on the target request is received.

After the terminal sends the target request, the base station configures and sends the first signaling for the terminal. The first signaling may be a RRCRelease signaling, and a first information unit existing in the first signaling includes relevant information configured by the base station for the terminal to reside on the target network. In some examples, the first information unit is a CellReselectionPriorities information unit.

At step 203, the terminal switches from the connected state to the idle state and resides on the target network according to the first signaling.

In the example of the present disclosure, through the RRCRelease signaling, the terminal is enabled to release the connection with the base station and switch to the idle state. In addition, by configuring the content of the first information unit in the first signaling, the base station can adjust the priority for the network frequency, and determine the network corresponding to the network frequency with a higher priority than the current network frequency of the terminal as the target network. And the first information unit is also configured with the time length of a target timer as a target value, where the target value includes an infinite value or an expected value of the time length requested by the terminal. Before the target timer expires, the priority for the network frequency of the target network is higher than the priority for the network frequency of the network which the terminal is currently on, so that the terminal can reside on the target network. The target timer is a timer indicating a valid time length of the priorities for the network frequencies, and may be a T320 timer.

In the above example, in case that the terminal is in the connected state and requires power saving, the terminal may send a target request so as to cause the base station to configure and send a first signaling, and according to the first signaling, the terminal may switch from the connected state to the idle state and reside on the target network. The target network is a previous generation communication network of the network which the terminal is currently on. By switching from the connected state to the idle state and residing on the target network, the terminal can achieve the purpose of saving power consumption.

In some examples, for the above step 201, the terminal may send a target request to the base station when determining that the terminal is in a connected state and requires power saving, and further, the terminal determines that it requires power saving if it does not need to use the network within a preset period of time.

In one possible implementation, the terminal may consider that it does not need to use the network within a preset period of time in case that its screen is off and the off duration reaches a preset time length.

In another possible implementation, the terminal may also consider that it does not need to use the network within a preset period of time in case that it is playing locally-cached videos or pictures.

In an example, when sending the target request to the base station, the terminal may send the target request via the second signaling. The second signaling may include a terminal auxiliary information signaling in the radio resource control signaling. Accordingly, the terminal may also configure some auxiliary information in the second signaling. In some examples, the auxiliary information includes configuration information expected by the terminal when the terminal requires power saving. Subsequently the base station can configure the first signaling based on the expected configuration information.

Figure 4:
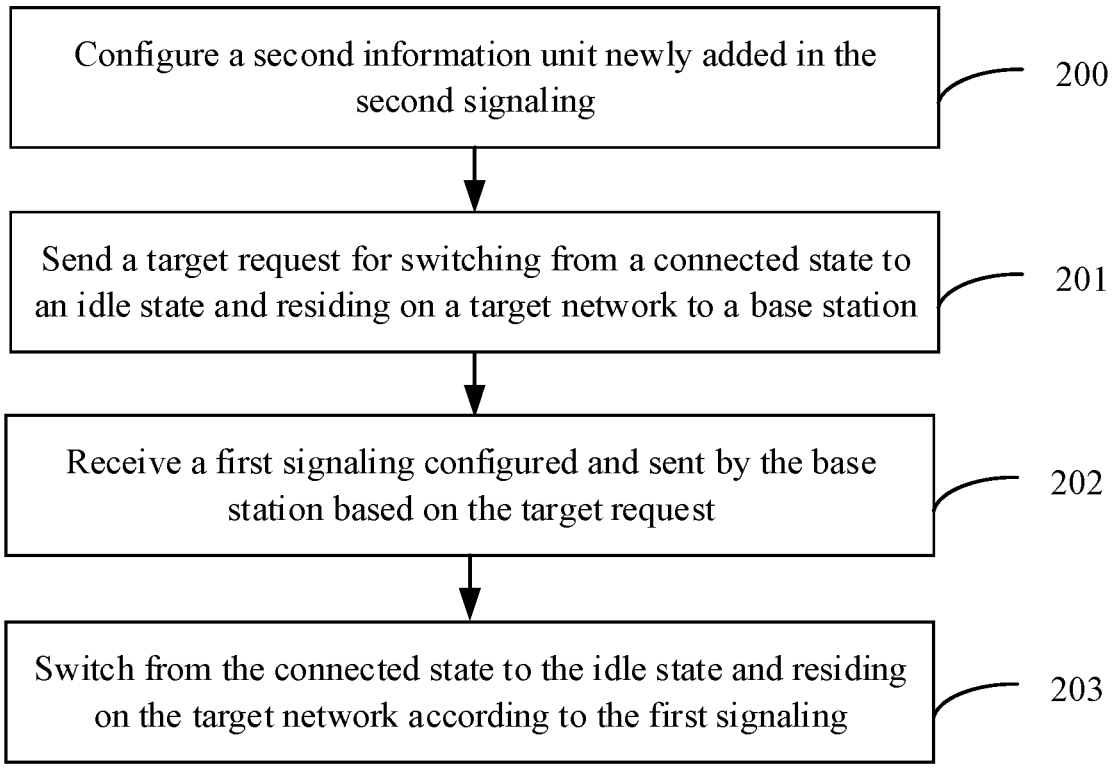
FIG. 4 is a schematic flow diagram illustrating another method for controlling a terminal according to an example.

Referring to FIG. 4, FIG. 4 is a flow diagram illustrating another method of controlling a terminal according to the example shown in FIG. 3. The method may further include the following steps.

At step 200, a second information unit newly added in the second signaling is configured.

In the example of the present disclosure, the second information unit may be an information unit newly added to the second signaling, for example, a ReleaseRequest information unit. The expected configuration information is indicated by the second information unit.

The terminal may configure, in the second information unit, at least one of: one or more radio access technology cells expected to be connected, an expected radio resource control state, network frequency information of one or more networks expected to be connected, a priority order for network frequencies of networks expected to be connected, and an expected value of time length for a target timer for indicating a valid time length of priorities for network frequencies.

The expected radio resource control state can be the idle state. The network frequency information of the networks expected to be connected can be information related to the network frequencies of networks such as 4G networks, 3G networks and other networks with lower network frequencies. The priority order for the network frequencies of the networks expected to be connected can represent a connection expectation of the terminal on the current network for the network frequencies of different networks, such as the expectation to connect to the 4G network first, then the 5G network and finally the 3G network, etc. An integer value can be used to indicate the connection expectation of network frequencies of different networks. The size of the integer value is directly proportional to the priority level, for example, the larger the integer value, the higher the priority level. In addition, the expected value of the time length is used to indicate a time length during which the terminal wishes to reside on the target network.

In the above example, the terminal can report the expected configuration information to the base station by configuring the second information unit newly added in the second signaling, and the base station can subsequently refer to the expected configuration information when configuring the first information unit in the first signaling, which is highly available.

Figure 5:
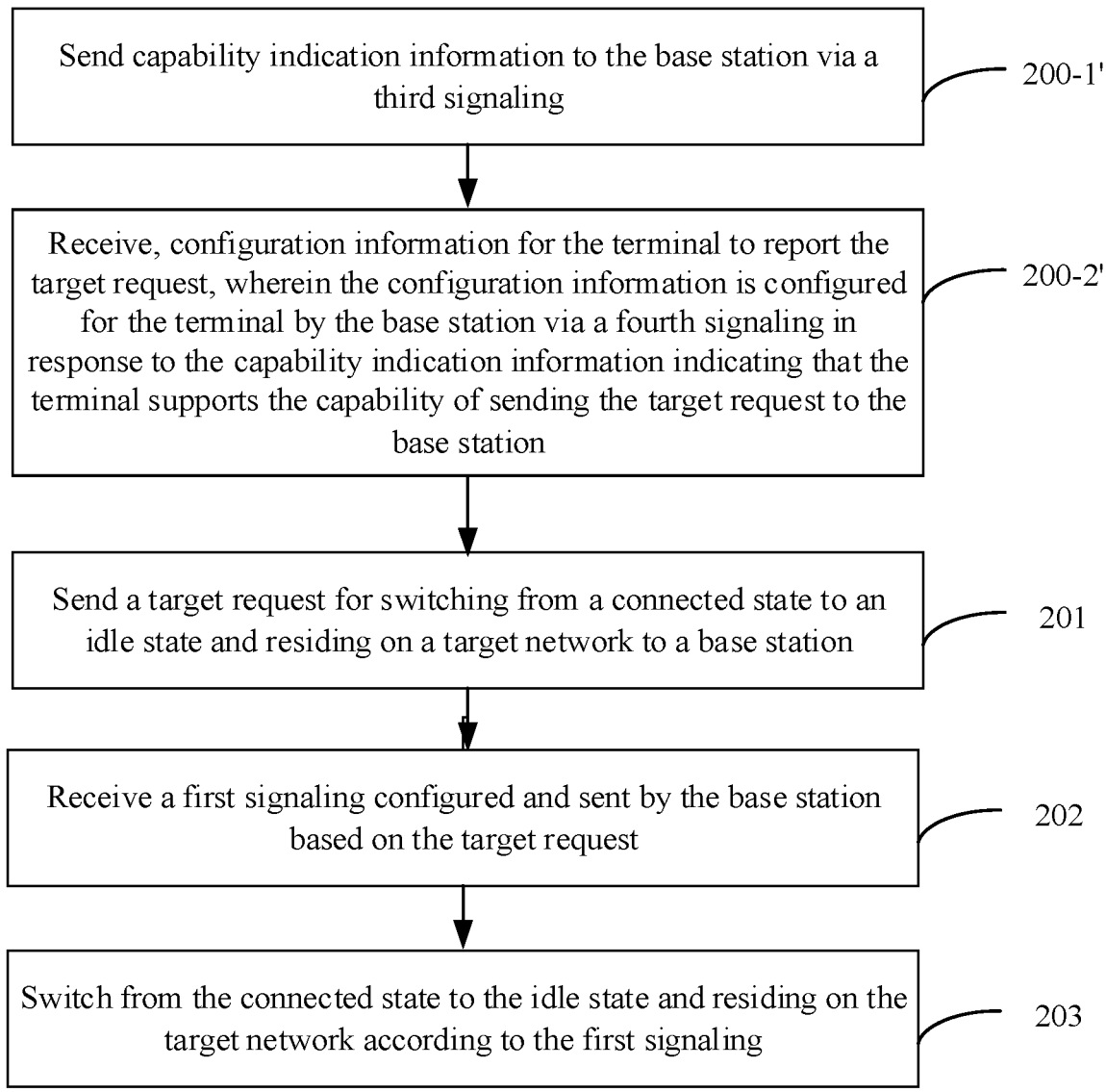
FIG. 5 is a schematic flow diagram illustrating another method for controlling a terminal according to an example.

In some examples, referring to FIG. 5, FIG. 5 is a flow diagram illustrating another method of controlling a terminal according to the example shown in FIG. 3. The method may further include the following steps.

At step 200-1', capability indication information is sent to the base station via a third signaling.

The capability indication information is used to indicate whether the terminal supports the capability of sending the target request to the base station. The third signaling may be a RRC signaling, and further, may be a UE-NR-Capability signaling.

In step 200-2', configuration information for the terminal to report the target request is received, where the configuration is configured for the terminal by the base station via a fourth signaling in response to the capability indication information indicating that the terminal supports the capability of sending the target request to the base station.

In the example of the present disclosure, the base station configures and sends a fourth signaling for the terminal after determining that the terminal supports the capability of sending the target request to the base station based on the capability indication information in the third signaling. The fourth signaling may include a RRCReconfiguration signaling, and the base station may configure the configuration information in an OtherConfig information unit existing in the fourth signaling.

Accordingly, step 201 may include: sending the target request to the base station based on the configuration information.

In the example of the present disclosure, the configuration information includes at least one of: indication information on whether the terminal is allowed to report the target request; a time length of a reporting block timer; a reporting condition of the target request; at least one of content of the target request and format of the target request.

Accordingly, the terminal side may perform at least one of the following.

The target request can be sent based on the configuration information for the terminal to report the target request configured by the base station. For example, the target request is sent to the base station in case that the indication information indicates the base station allowing the terminal to report the target request.

The target request can also be sent based on the reporting condition of the target request, such as whether the terminal does not need to use the network within a preset period of time. After determining that the reporting condition is satisfied, the terminal can report the target request.

Based on the time length of the reporting block timer, it is required for the terminal to wait for the time length of the reporting block timer before it can report the target request.

The terminal may also report the target request based on at least one of the content and format of the target request in the configuration information.

Figure 6:
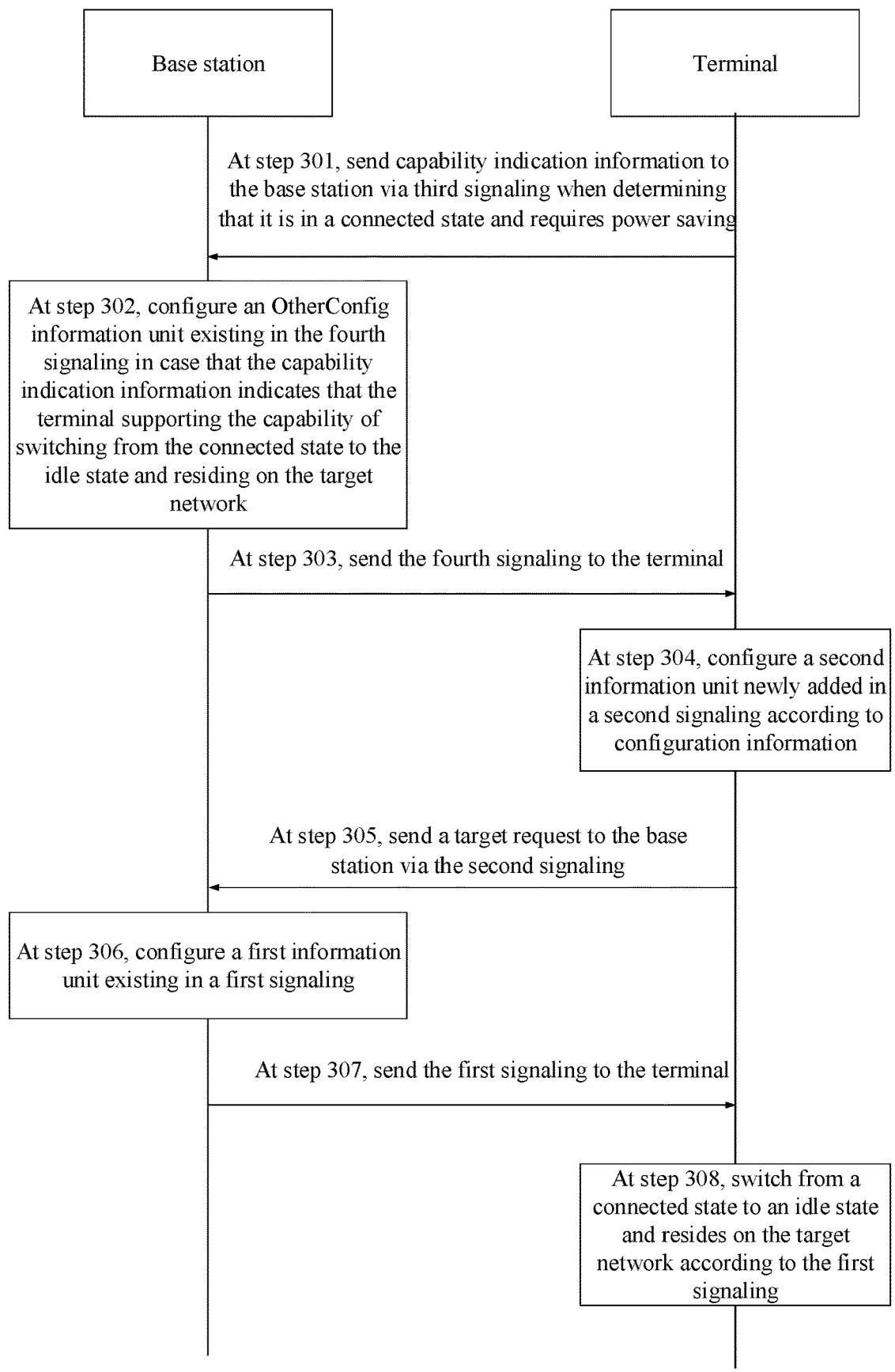
FIG. 6 is a schematic flow diagram illustrating another method for controlling a terminal according to an example.

In an example, with reference to FIG. 6, FIG. 6 is a flow diagram illustrating another method of controlling a terminal illustrated according to an example. The method may include the following steps.

At step 301, the terminal sends capability indication information to the base station via third signaling when determining that the terminal is in a connected state and requires power saving.

The capability indication information is for indicating whether the terminal supports capability of switching from a connected state to an idle state and residing on a target network. The third signaling may be a UE-NR-Capability signaling.

At step 302, the base station configures an OtherConfig information unit existing in a fourth signaling in case that the capability indication information indicates the terminal supporting the capability of switching from the connected state to the idle state and residing on the target network.

The fourth signaling is a RRCReconfiguration signaling. The base station configures, in the OtherConfig information unit, at least one of: indication information on whether to allow the terminal to report the target request; a time length of a reporting block timer; a report condition for reporting the target request; and at least one of content and format of the target request.

At step 303, the base station sends the fourth signaling to the terminal.

At step 304, the terminal configures a second information unit newly added in a second signaling according to configuration information indicated by the fourth signaling.

The second signaling is a terminal auxiliary information signaling, and the second information unit is an information unit for indicating expected configuration information of the terminal when requiring power saving.

At step 305, the terminal sends a target request to the base station via the second signaling.

At step 306, the base station configures a first information unit existing in a first signaling.

The first signaling is a RRCRelease signaling, and the first information unit is an information unit for indicating cell reselection priorities.

At step 307, the base station sends the first signaling to the terminal.

At step 308, the terminal switches from the connected state to the idle state and resides on the target network according to the first signaling.

In the above example, when the terminal requires power saving, the state of the terminal can be switched to the idle state, and the terminal can reside on the target network, thus achieving the purpose of saving power consumption of the terminal.

Corresponding to the aforementioned examples of the method implementing the application functions, the present disclosure also provides examples of apparatuses implementing the application functions.

Figure 7:
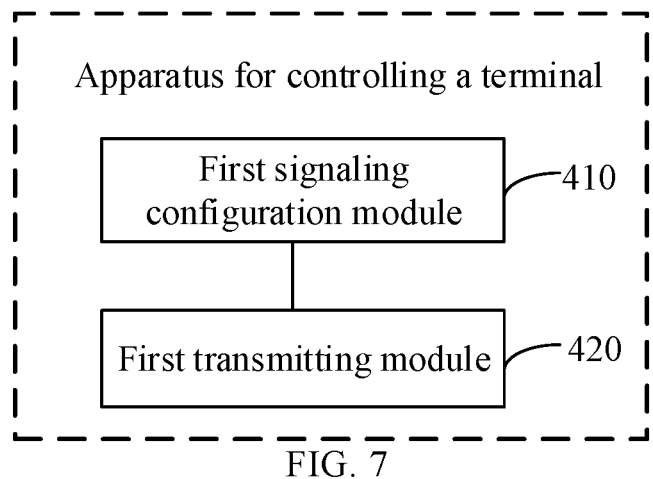
FIG. 7 is a block diagram illustrating an apparatus for controlling a terminal according to an example.

Referring to FIG. 7, FIG. 7 is a block diagram illustrating an apparatus for controlling a terminal according to an example. The apparatus is applied to a base station and includes: a first signaling configuration module 410, for configuring a first signaling; where the first signaling is for indicating the terminal to switch from a connected state to an idle state and to reside on the target network; a first transmitting module 420, for sending the first signaling to the terminal.

Figure 8:
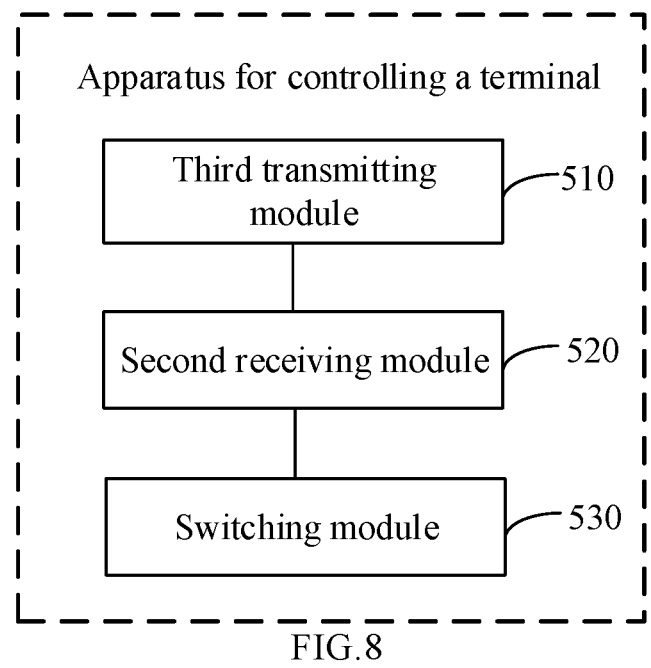
FIG. 8 is a block diagram illustrating another apparatus for controlling a terminal according to an example.

Referring to FIG. 8, FIG. 8 is a block diagram illustrating another apparatus for controlling a terminal according to an example. The apparatus is applied to a terminal and includes: a third transmitting module 510 for sending a target request for switching from a connected state to an idle state and residing on a target network to a base station; a second receiving module 520 for receiving a first signaling configured and sent by the base station based on the target request; a switching module 530, for switching from the connected state to the idle state and residing on the target network according to the first signaling.

For the apparatus example, since the apparatus examples substantially correspond to the method examples, a reference may be made to part of the descriptions of the method examples for the related part. The apparatus examples described above are merely illustrative, where the units described as separate components may or may not be physically separated, and the components displayed as units may or may not be physical units, i.e., may be located in one place or may be distributed to multiple network units. Part or all of the modules may be selected according to actual requirements to implement the objectives of the solutions in the examples. Those of ordinary skill in the art may understand and carry out them without creative work.

Accordingly, the present disclosure also provides an apparatus for controlling a terminal, applied to a base station, and the apparatus includes: a processor; a memory for storing instructions executable by the processor, where the processor is configured to perform any of the methods for controlling the terminal from the perspective of a base station as described above.

Figure 9:
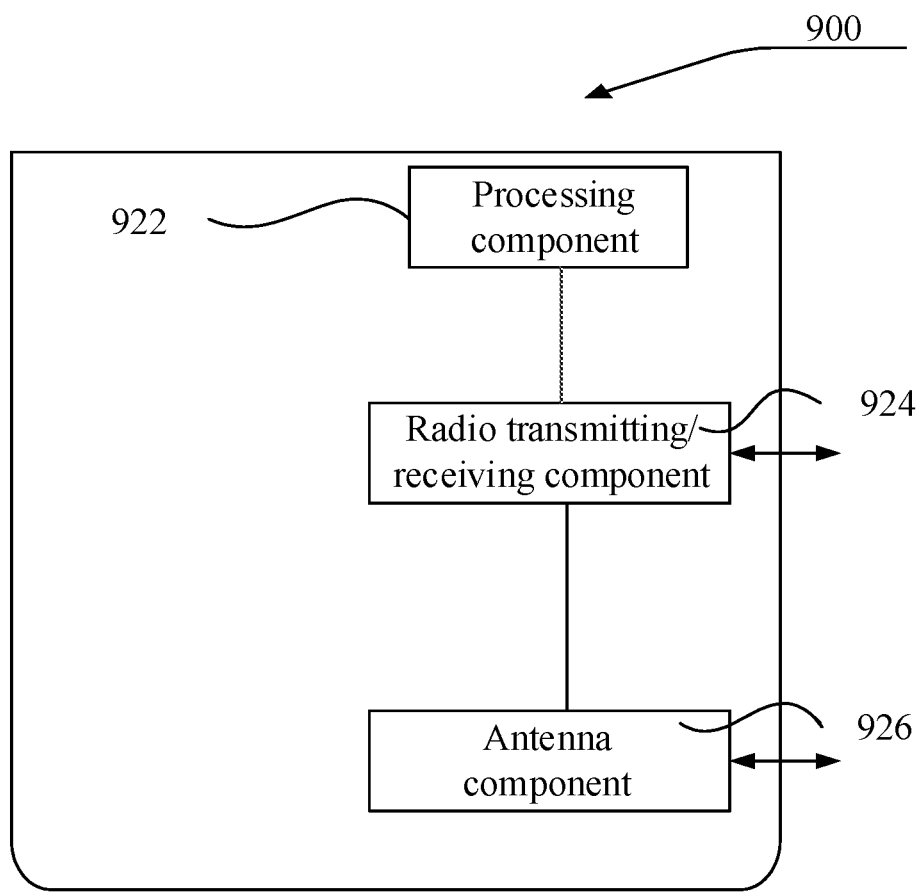
FIG. 9 is a schematic structural diagram illustrating an apparatus for controlling a terminal according to an example of the present disclosure.

As shown in FIG. 9, FIG. 9 is a structural diagram illustrating an apparatus 900 for controlling a terminal according to an example. The apparatus 900 may be provided as a base station. Referring to FIG. 9, the apparatus 900 includes a processing component 922, a radio transmitting/receiving component 924, an antenna component 926, and a signal processing portion specific to a wireless interface. The processing component 922 may further include one or more processors.

One of the processors in the processing assembly 922 may be configured to perform any of the methods of controlling the terminal as described above.

Correspondingly, the present disclosure also provides an apparatus for controlling a terminal, which is applied to a terminal and includes: a processor; a memory for storing instructions executable by the processor, where the processor is configured to perform any of the methods for controlling the terminal from the perspective of a terminal as described.

Figure 10:
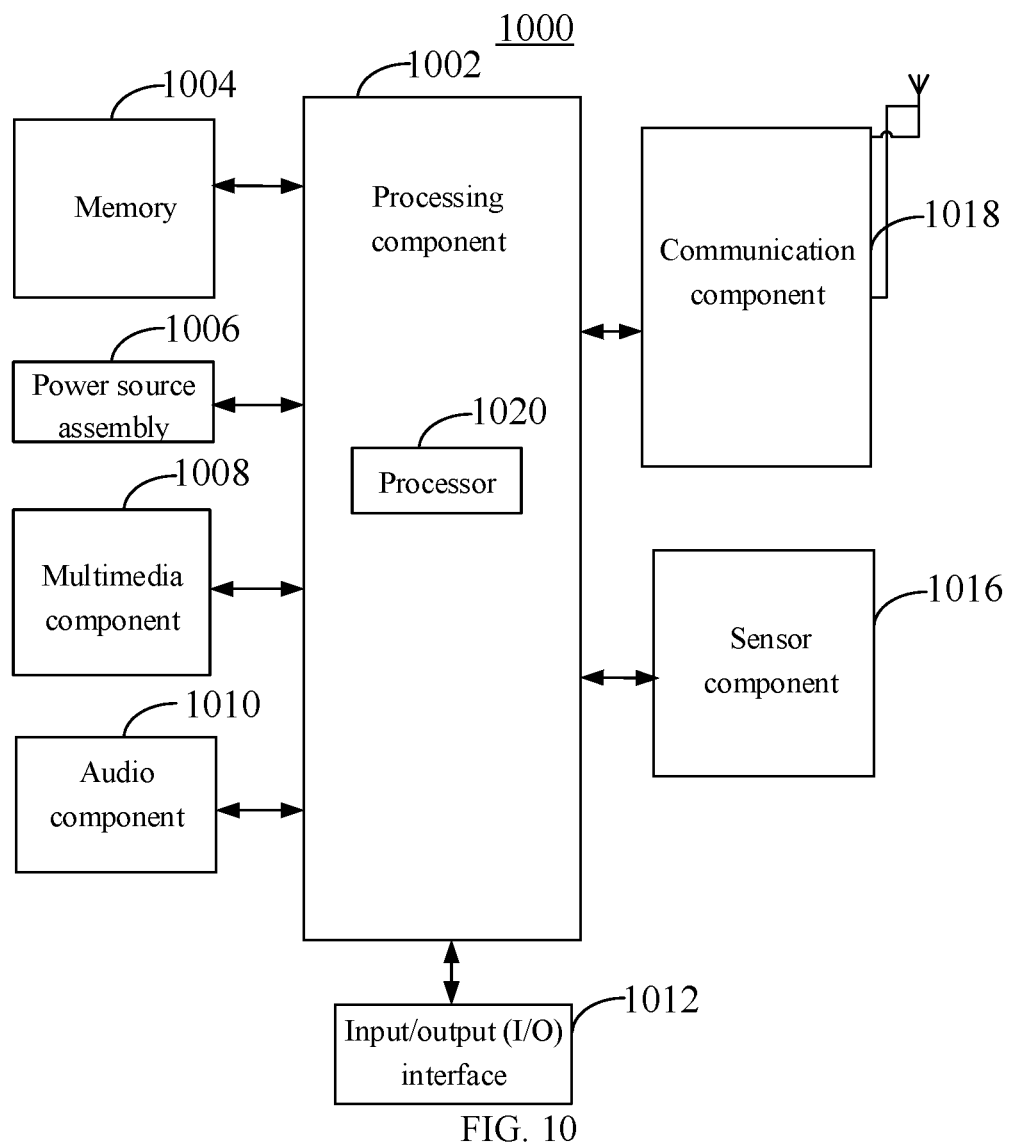
FIG. 10 is a schematic structural diagram illustrating another device for controlling a terminal according to an example of the present disclosure.

FIG. 10 is a structural diagram illustrating an electronic device 1000 according to an example of the present disclosure. For example, the electronic device 1000 may be a mobile phone, a tablet computer, an e-book reader, a multimedia player, a wearable device, a vehicle-mounted terminal, an iPad, a smart TV, and other terminals.

Referring to FIG. 10, the electronic device 1000 may include one or more of the following components: a processing component 1002, a memory 1004, a power source assembly 1006, a multimedia component 1008, an audio component 1010, an input/output (I/O) interface 1012, a sensor component 1016, and a communication component 1018.

The processing component 1002 generally controls the overall operation of the electronic device 1000, such as operations associated with displays, phone calls, data communications, camera operations, and recording operations. The processing component 1002 may include one or more processors 1020 to execute instructions to complete all or part of the steps of the above method of controlling the terminal. Further, the processing component 1002 may include one or more modules to facilitate interaction between the processing component 1002 and another component. For example, the processing component 1002 may include a multimedia module to facilitate the interaction between the multimedia component 1008 and the processing component 1002. For another example, the processing component 1002 may read executable instructions from the memory to perform steps in the method of controlling a terminal provided in the above examples.

The memory 1004 is configured to store different types of data to support operation at the electronic device 1000. Examples of such data include instructions for any application or method that operates on the electronic device 1000, contact data, phonebook data, messages, pictures, videos, and so on. The memory 1004 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a CD.

The power source assembly 1006 provides power to different assemblies of the electronic device 1000. The power source assembly 1006 may include a power source management system, one or more power sources and other assemblies associated with generating, managing and distributing power for the electronic device 1000.

The multimedia component 1008 includes a display screen that provides an output interface between the electronic device 1000 and a user. In some examples, the multimedia component 1008 may include a front camera and/or a rear camera. When the electronic device 1000 is in an operating mode, such as in a shooting mode or a video mode, the front camera and/or the rear camera may receive external multimedia data. Each of the front camera and the rear camera may be a fixed optical lens system or be of a focal length and a capability of an optical zoom.

The audio component 1010 is configured to output and/or input an audio signal. For example, the audio component 1010 includes a microphone (MIC). When the electronic device 1000 is in an operating mode, for example, in a call mode, a recording mode or a speech recognition mode, the microphone is configured to receive an external audio signal. The received audio signal may be further stored in the memory 1004 or sent via the communication component 1018. In some examples, the audio component 1010 also includes a speaker for outputting an audio signal.

The I/O interface 1012 may provide an interface between the processing component 1002 and peripheral interface modules. The above peripheral interface modules may include a keyboard, a click wheel, buttons and so on. These buttons may include but not limited to, a home button, a volume button, a start button and a lock button.

The sensor component 1016 includes one or more sensors for evaluating states of the electronic device 1000 in different aspects. For example, the sensor component 1016 may detect the on/off status of the electronic device 1000, and relative positioning of component, for example, the component is a display and a keypad of the electronic device 1000. The sensor component 1016 may also detect a change in position of the electronic device 1000 or a component of the electronic device 1000, a presence or absence of the contact between a user and the electronic device 1000, an orientation or an acceleration/deceleration of the electronic device 1000, and a change in temperature of the electronic device 1000. The sensor component 1016 may include a proximity sensor for detecting the existence of a nearby object without any physical touch. The sensor component 1016 may also include an optical sensor, such as a CMOS or CCD image sensor used in an imaging application. In some examples, the sensor component 1016 may also include an acceleration sensor, a gyro sensor, a magnetic sensor, a pressure sensor, or a temperature sensor.

The communication component 1018 is configured to facilitate wired or wireless communication between the electronic device 1000 and other devices. The electronic device 1000 may access a wireless network based on a communication standard, such as Wi-Fi, 2G, 3G, 4G or 5G, or a combination thereof. In some examples, the communication component 1018 may receive a broadcast signal or broadcast-related information from an external broadcast management system via a broadcast channel. In an example, the communication component 1018 may also include a Near Field Communication (NFC) module to facilitate short-range communications. For example, the NFC module may be implemented based on radio frequency identification (RFID) technology, infrared data association (IrDA) technology, ultra-wideband (UWB) technology, Bluetooth (BT) technology and other technologies.

In examples, the electronic device 1000 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing the above-mentioned control terminal method.

In examples, a non-transitory machine-readable storage medium including instructions, such as a memory 1004 including instructions, the instructions being executable by a processor 1020 of the electronic device 1000 to accomplish the radio charging method described above, is also provided. For example, the non-transitory computer-readable storage medium may be ROM, random access memory (RAM), CD-ROM, magnetic tape, floppy disk, and optical data storage device, among others.

The technical solutions provided by examples of the present disclosure may include the following beneficial effects.

In examples of the present disclosure, the base station can configure and send the first signaling so that the terminal can switch from the connected state to the idle state and reside on the target network, thereby saving the terminal power consumption.

In examples of the present disclosure, the first signaling can include RRC release signaling, and when configuring the first signaling, the first information unit existing in the first signaling can be configured so that the terminal can switch from the connected state to the idle state and reside on the target network. The first information unit is the information unit used in the first signaling to indicate the cell reselection priority, which is easy to implement and highly available.

In examples of the present disclosure, the base station, in the process of configuring the first information unit, may use at least one of the following ways: configuring a priority for a network frequency of a target network to be higher than a priority for a network frequency of a network in which the terminal is currently located, so that the terminal can reside in the target network; configuring priorities for different network frequencies according to a priority order for a network frequency of an expected connected network requested by the terminal, so as to improve the accuracy of reducing power consumption for different terminals; configuring the time length of the target timer as a target value, where the target timer is a timer for indicating the valid time length of the priority for the network frequency, and the target value may include an infinite value or an expected value of time length requested by the terminal, thereby causing the terminal to reside on the target network before the target timer ends which is highly available.

In examples of the present disclosure, the base station may configure the first signaling upon determining that the terminal in the connected state requires power saving. Further, the base station determines that the terminal in the connected state requires power saving after receiving a target request sent by the terminal via the second signaling, and the target request is used to request switching its state from the connected state to the idle state and residing on the target network. In the present disclosure, the base station configures and sends the first signaling so that the terminal can switch to the idle state and reside on the target network, which is easy to implement and highly available.

In examples of the present disclosure, the base station can also receive the capability indication information sent by the terminal via the third signaling prior to configuring the first signaling, so as to determine whether the terminal supports the capability of sending the target request to the base station. And in the case that the terminal supports the capability of sending the target request to the base station, the base station can configure and send the fourth signaling, so that the terminal can subsequently send the target request based on the configuration information indicated by the fourth signaling, which is highly available.

In examples of the present disclosure, in response to the terminal sending a target request for switching from a connected state to an idle state and residing on the target network, the base station can configure and send a first signaling, so that the terminal can switch from a connected state to an idle state and reside on the target network according to the first signaling. By switching from the connected state to the idle state and residing on the target network, the purpose of saving power consumption of the terminal is achieved.

In examples of the present disclosure, the terminal may send a target request to the base station via the second signaling, where the second signaling includes the terminal auxiliary information signaling in the RRC. The terminal can also configure the newly added second information unit in the second signaling to report the expected configuration information of the base station itself when power saving is required, and subsequently the base station can configure the first signaling based on the content of the second information unit to improve the accuracy of the base station in saving power for different terminals.

Other implementations of the present disclosure will be apparent to those skilled in the art from consideration of the specification and practice of the present disclosure herein. The present disclosure is to cover any variations, uses, or adaptations of the present disclosure that follow the general principles thereof and include common knowledge or conventional technical means in the related art that are not disclosed in the present disclosure. The specification and examples are considered as examples only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method for controlling a terminal, wherein the method is applied to a base station, comprising:
    configuring a first signaling, wherein the first signaling is for instructing the terminal to switch from a connected state to an idle state and to reside on a target network; and
    sending the first signaling to the terminal,
    wherein the first signaling comprises a Radio Resource Control (RRC) Release signaling, and
    wherein configuring the first signaling comprises configuring a first information unit existing in the first signaling, wherein the first information unit is an information unit for indicating cell reselection priorities;
    wherein configuring the first information unit existing in the first signaling comprises at least one of:
        configuring, in the first information unit, a priority for a network frequency of the target network to be higher than a priority for a network frequency of a network which the terminal is currently on;
        configuring, in the first information unit, priorities for different network frequencies based on a priority order for network frequencies of expected connected networks requested by the terminal; or
        configuring, in the first information unit, a time length of a target timer as a target value; wherein the target timer is a timer for indicating a valid time length of the priorities for the network frequencies, and the target value comprises an infinite value or an expected value of the time length requested by the terminal.

2. The method according to claim 1, wherein configuring the first signaling comprises:
    configuring the first signaling when it is determined that the terminal in the connected state requires power saving.

3. The method according to claim 2, wherein determining that the terminal in the connected state requires power saving comprises:
    determining that the terminal in the connected state requires power saving in response to receiving a target request sent by the terminal to the base station via a second signaling, wherein the target request is for requesting to switch a state of the terminal from the connected state to the idle state and reside on the target network.

4. The method according to claim 3, wherein before receiving the target request sent by the terminal to the base station via the second signaling, the method further comprises:
    receiving capability indication information sent by the terminal via a third signaling, wherein the capability indication information is for indicating whether the terminal supports capability of sending the target request to the base station;
    configuring a fourth signaling in response to the capability indication information indicating that the terminal supports the capability of sending the target request to the base station, wherein the fourth signaling is for indicating configuration information for the terminal to report the target request; and
    sending the fourth signaling to the terminal, so that the terminal sends the target request to the base station via the second signaling based on the configuration information.

5. The method according to claim 4, wherein the fourth signaling comprises a RRCReconfiguration signaling, and wherein configuring the fourth signaling comprises configuring, in an OtherConfig information unit of the fourth signaling, the configuration information for the terminal to report the target request.

6. The method according to claim 5, wherein configuring, in the OtherConfig information unit of the fourth signaling, the configuration information for the terminal to report the target request, comprises at least one of:
configuring, in the OtherConfig information unit, indication information on whether the terminal is allowed to report the target request;
configuring, in the OtherConfig information unit, a time length of a reporting block timer;
configuring, in the OtherConfig information unit, a reporting condition of the target request; or
configuring, in the OtherConfig information unit, at least one of content and format of the target request.

7. The method according to claim 1, wherein the target network is a communication network different from a network which the terminal is currently on.

8. A method for controlling a terminal, wherein the method is applied to a terminal, comprising:
sending a target request for switching from a connected state to an idle state and residing on a target network to a base station;
receiving a first signaling configured and sent by the base station based on the target request; and
switching from the connected state to the idle state and residing on the target network according to the first signaling,
wherein the first signaling comprises a Radio Resource Control (RRC) Release signaling, and
wherein switching from the connected state to the idle state and residing on the target network, according to the first signaling, comprises:
switching from the connected state to the idle state according to the first signaling;
determining, in the first signaling, a previous generation communication network with a higher priority for network frequency than a network which the terminal is currently on, as the target network; and
residing on the target network until the target timer in the first signaling expires, wherein the target timer is a timer for indicating a valid time length of priorities for network frequencies.

9. The method according to claim 8, wherein sending the target request for switching from the connected state to the idle state and residing on the target network to the base station comprises:
sending the target request to the base station when determining that the terminal is in the connected state and requires power saving.

10. The method according to claim 9, further comprising:
determining that the terminal requires power saving by determining that there is no need to use a network within a preset period of time.

11. The method according to claim 8, wherein sending the target request for switching from the connected state to the idle state and residing on the target network to the base station comprises:
sending the target request to the base station via a second signaling.

12. The method according to claim 11, wherein the second signaling comprises a terminal auxiliary information signaling of a radio resource control signaling, and
wherein prior to sending the target request to the base station, the method further comprises:
configuring a second information unit newly added in the second signaling, wherein the second information unit is an information unit for indicating expected configuration information of the terminal when requiring power saving.

13. The method according to claim 12, wherein configuring the second information unit newly added in the second signaling comprises at least one of:
configuring, in the second information unit, one or more radio access technology cells expected to be connected;
configuring, in the second information unit, an expected radio resource control state;
configuring, in the second information unit, network frequency information of one or more networks expected to be connected;
configuring, in the second information unit, a priority order for network frequencies of one or more networks expected to be connected; or
configuring, in the second information unit, an expected value of time length for a target timer for indicating a valid time length of priorities for network frequencies.

14. The method according to claim 8, wherein prior to sending the target request for switching from the connected state to the idle state and residing on the target network to the base station, the method further comprises:
sending capability indication information to the base station via a third signaling, wherein the capability indication information is for indicating whether the terminal supports capability of sending the target request to the base station;
receiving configuration information for the terminal to report the target request, wherein the configuration information is configured for the terminal by the base station via a fourth signaling in response to the capability indication information indicating that the terminal supports the capability of sending the target request to the base station; and
sending the target request for switching from the connected state to the idle state and residing on the target network to the base station, comprising:
sending the target request to the base station based on the configuration information,
wherein the third signaling comprises a UE-NR-Capability signaling of a radio resource control signaling.

15. The method according to claim 14, wherein sending the target request to the base station based on the configuration information comprises at least one of:
sending the target request to the base station in response to indication information comprised in the configuration information indicating that the base station allows the terminal to report the target request;
sending the target request to the base station in response to a reporting condition comprised in the configuration information being satisfied;
waiting for a time length of a reporting block timer comprised in the configuration information to send the target request to the base station; or
sending the target request to the base station based on at least one of content and format of the target request comprised in the configuration information.

16. An apparatus for controlling a terminal, the apparatus being applied to a base station, and comprising:
a processor; and
a memory for storing instructions executable by the processor, wherein the processor is configured to perform the method for controlling the terminal according to claim 1.

17. An apparatus for controlling a terminal, the apparatus being applied to a terminal, and comprising:
   a processor; and
   a memory for storing instructions executable by the processor,
   wherein the processor is configured to perform operations comprising:
      sending a target request for switching from a connected state to an idle state and residing on a target network to a base station;
      receiving a first signaling configured and sent by the base station based on the target request; and
      switching from the connected state to the idle state and residing on the target network according to the first signaling,
   wherein the first signaling comprises a Radio Resource Control (RRC) Release signaling, and
   wherein switching from the connected state to the idle state and residing on the target network, according to the first signaling, comprises:
      switching from the connected state to the idle state according to the first signaling;
      determining, in the first signaling, a previous generation communication network with a higher priority for network frequency than a network which the terminal is currently on, as the target network; and
      residing on the target network until the target timer in the first signaling expires, wherein the target timer is a timer for indicating a valid time length of priorities for network frequencies.

* * * * *